United States Patent [19]

Brierley et al.

[11] Patent Number: 5,244,493
[45] Date of Patent: * Sep. 14, 1993

[54] BIOMETALLURGICAL TREATMENT OF PRECIOUS METAL ORES HAVING REFRACTORY CARBON CONTENT

[75] Inventors: James A. Brierley, Sandy, Utah; Charles F. Kulpa, Jr., Niles, Mich.

[73] Assignees: Newmont Gold Co.; Newmont Mining Corporation, both of Denver, Colo.

[*] Notice: The portion of the term of this patent subsequent to Jul. 7, 2009 has been disclaimed.

[21] Appl. No.: 907,700

[22] Filed: Jul. 2, 1992

Related U.S. Application Data

[63] Continuation-in-part of Ser. No. 750,444, Aug. 20, 1991, Pat. No. 5,127,942, which is a continuation of Ser. No. 586,424, Sep. 21, 1990, abandoned.

[51] Int. Cl.$^5$ ............................................. C22B 11/00
[52] U.S. Cl. ............................... 75/743; 423/DIG. 17
[58] Field of Search .................. 75/743; 423/DIG. 17

[56] References Cited

U.S. PATENT DOCUMENTS 5,127,942  7/1992  Brierley ............................ 75/743

Primary Examiner—Peter D. Rosenberg
Attorney, Agent, or Firm—Fred A. Keire; William J. Spatz

[57] ABSTRACT

A method is provided for the recovery of precious metal values, such as gold and silver, from refractory carbonaceous, or carbonaceous-sulfidic ore material. The ore material is inoculated using a specific microbial consortium and then incubated to deactivate the carbonaceous component of the material to prevent binding of the precious metal values to the carbonaceous component. The precious metal is then recovered.

17 Claims, No Drawings

BIOMETALLURGICAL TREATMENT OF PRECIOUS METAL ORES HAVING REFRACTORY CARBON CONTENT

CROSS-REFERENCE TO RELATED APPLICATIONS

This application is a continuation-in-part application of U.S. patent application Ser. No. 07/750,444, filed Aug. 20, 1991 now U.S. Pat. No. 5,127,942. That application is, in turn, a continuation of U.S. patent application Ser. No. 07/586,424, filed Sep. 21, 1990, now abandoned.

The invention relates to improving the recovery of precious metal values from precious metal ores that have a carbon content that renders them refractory to the recovery of those precious metal values, such as refractory carbonaceous and carbonaceous-sulfidic refractory precious metal ores, e.g., carbonaceous/carbonaceous-sulfidic leach grade ores, mill grade ores, concentrates, tailings and mine or refining waste.

STATE OF THE ART

It is known to subject sulfide materials containing precious metals, such as mineral sulfides, tailings, and the like, to pre-oxidation in order to facilitate the liberation of gold and/or silver and to enhance the recovery of gold and/or silver by cyanide-based leaching, particularly sulfide materials having a carbonaceous component that render the material refractory to treatment.

Such sulfide materials frequently contain iron in the ferrous state with or without other metals in the form of complex compounds. The precious metals are usually occluded within the sulfide mineral. For example, gold occurs as finely disseminated sub-microscopic particles in a refractory sulfide host, such as pyrite or arsenopyrite, and not as a solid solution as is often mistakenly thought. Because of the foregoing characteristic, this type of occluded gold cannot be liberated easily by fine grinding and then directly and efficiently recovered by cyanidation. Attempts to recover gold by this method generally result in recoveries in the neighborhood of about 20% to 60% and in high cyanide consumption which renders the process uneconomical.

One method for freeing up the precious metals has been to subject the sulfide material to oxidation roasting to remove sulfur as $SO_2$ and provide an oxide residue which is thereafter leached with a cyanide solution to dissolve the liberated gold and silver. The gold and silver are thereafter subsequently recovered from solution using known processes. However, oxidation roasting of sulfide ores or concentrate present environmental problems and also tend to be cost intensive. Even then, it may be difficult to remove the precious metals by cyanidation.

To avoid the aforementioned environmental problems associated with the oxidation roasting of sulfide ores, oxidative bioleaching of the ore has been proposed.

One known method is to use bacteria, such as *Thiobacillus ferrooxidans*, Sulfolobus species, Acidianus species and facultative-thermophilic bacteria, to oxidize sulfide minerals. This method results in solubilization of metal values from the minerals. The foregoing microorganisms also oxidize pyrite resulting in solubilization of iron, as ferric iron, sulfide, as sulfate ion. This process has been proposed for enhancing the recovery of gold from refractory sulfide materials in which the precious metals are present as finely disseminated microscopic particles in the sulfide host, e.g., pyrite or arsenopyrite.

U.S. Pat. No. 4,729,788 which issued on Mar. 8, 1988, and which is incorporated herein by reference discloses a bioleaching process for precious metal enhanced recovery from carbonaceous sulfide ore. According to the process disclosed, thermophilic bacteria, such as Sulfolobus species, and facultative-thermophilic bacteria are used to oxidize the sulfide constituents of the ore. The bioleached residue is then treated with a carbon-adsorbable blanking agent to inhibit the precious-metal-adsorbing propensity of the carbonaceous component of the ore. The precious metals are then extracted from the ore using a solution of cyanide or thiourea. The carbon-adsorbable blanking agent disclosed in the patent is not a product of a microbial consortium as is disclosed in the present invention.

It would be desirable to provide a bioleaching process for recovering precious metals, e.g., gold and/or silver, from refractory carbonaceous and refractory carbonaceous-sulfidic material using bacteria that are viable at low and elevated temperatures, i.e., temperatures of 15° C. and above, for example, temperatures ranging from over about 15° to about 90° C.

BRIEF SUMMARY OF THE INVENTION

It is an object of the invention to provide a microbiological process for improving the recovery of precious metal values from precious metal ores that have a carbon content that renders them refractory to the recovery of those precious metal values, such as refractory carbonaceous and/or carbonaceous-sulfidic precious metal ore materials.

Another object of the invention is to provide a microbiological process for the deactivation of the preg-robbing carbon component of refractory carbonaceous and carbonaceous-sulfidic material to inhibit binding of dissolved precious metal values to the carbonaceous material.

These and other objects will be described in the following disclosure.

The invention provides a method for improving the recovery of precious metals from refractory carbonaceous and/or carbonaceous-sulfidic materials in which the precious metal values are occluded in a form that inhibits the recovery thereof by conventional leaching and lixiviation processes without pretreatment.

Stating it broadly, the invention is directed to a method for improving the recovery of precious metals from refractory carbonaceous and/or carbonaceous-sulfidic ore materials by leaching or lixiviation in which the carbonaceous component of the ore material has the propensity of adsorbing said precious metal values following liberation of those values from the leached or lixiviated ore, thereby adversely affecting the efficiency of recovery of said precious metal values.

DETAILED DESCRIPTION

The invention relates, inter alia, to a biometallurgical process for treating refractory metal ore materials that comprises a) inoculating a precious metal ore material having a carbon content that renders the ore material refractory to the recovery of those precious metal values with a refractory carbon-deactivating microbial agent, b) incubating the inoculated ore under conditions sufficient to produce metabolism and growth of the microbial agent and, thereby, at least partially deactivate the refractory carbon, and c) recovering the precious metal values by suitable leaching or lixiviation means. In a preferred embodiment of the invention a carbonaceous-sulfidic ore material is biooxidized such that the sulfidic sulfur content is at least partially biooxidized before being subjected to the foregoing biometallurgical process. In an alternative embodiment the carbonaceous-sulfidic ore material is biooxidized after the ore material has been inoculated and incubated, but before recovery of the desired precious metal values. Further, biooxidation may occur contemporaneously with the incubation.

The terms "ore" or "ore material" as used herein refer both to ore and to ore concentrates, tailings and waste that have sufficient precious metal values present to indicate that recovery of those values is economical.

Suitable candidate ores for the practice of the present invention have a carbon content the presence of which inhibits precious metal recovery using leaching or lixiviation processes. Such ores are referred to as being "refractory." The refractory carbon content in these precious metal ores is a significant source of impaired recovery of precious metal values in those ores since it is a significant source of "preg-robbing". "Preg-robbing" refers to the ability of this refractory carbon content to remove, or "rob", precious metal values that have been leached out of the ore material during lixiviation and held in solution or complex from that precious metal-"pregnant" lixiviant solution. It is believed that the carbonaceous content that participates in the preg-robbing comprises an activated carbon-type carbon material, long-chain hydrocarbons and organic acids, such as humic acid. See Sibrell, P. L. et al., *Spectroscopic Analysis of Passivation Reactions for Carbonaceous Matter from Carlin Trend Ores*, GOLD 90, PROCESS MINERALOGY X, pp. 355-363 (1990).

The present invention is suitable for refractory carbonaceous ores and refractory carbonaceous-sulfidic ores that may have the following level of carbon on a percent by weight basis:

| CARBON | WEIGHT PERCENT |
|---|---|
| Acid Soluble | 0.1-0.5 |
| Acid Insoluble | 0.2-4.0 |

Other and specific ores that may be advantageously treated in accordance with the described processes are: Gold Quarry Deposit carbonaceous or carbonaceous-sulfidic ores, Post Deposit carbonaceous or carbonaceous-sulfidic ores; Genesis Deposit carbonaceous or carbonaceous-sulfidic ores; Carlin Deposit carbonaceous or carbonaceous-sulfidic ores; Pete Deposit carbonaceous or carbonaceous-sulfidic ores and other ores from which leaching of precious metal values could be facilitated by the process of the present invention.

Candidate ores may be obtained from deposits in the regions around Carlin, Nev.

Candidate carbonaceous ores have the following representative elemental and mineralogical analyses:

| REPRESENTATIVE ELEMENTAL ANALYSIS | |
|---|---|
| ELEMENT | WEIGHT PERCENT |
| Arsenic | 0.1-1 Percent |
| Sulfur (Total) | 0.5-3.5 Percent |
| Carbon (Total) | 0.1-4.0 Percent |
| Iron | 1-4 Percent |
| Zinc | 0.01-0.1 Percent |
| Strontium | 0.2-0.5 Percent |
| Gold | .03 Ounces per ton |
| REPRESENTATIVE MINERALOGICAL ANALYSIS | |
| Mineral | Weight Percent |
| Quartz | 31-75 Percent |
| Pyrite | 1-4 Percent |
| Carbonate | 0-50 Percent |
| Kaolinite | 2-20 Percent |
| $Fe_xO_y$ | 1-3 Percent |
| Illite | 5-12 Percent |
| Alunite | 0-8 Percent |
| Barite | 1-4 Percent |

The ore material is preferably processed in a bulk form, such as a heap, a spoil or a dam of particles and/or particulates (such as, particulates formed by the agglomeration of ore particles.) While heap processing is preferred, landfarming or windrows may be used. If desired, the ore material can also be treated in confining vessels, such as large columns, vats, tanks and the like—a form that is particularly advantageous for recirculating a solution containing microbial agent or nutrients or both. When the ore is processed in a static form, such as a heap, spoil, dam, windrow, column, etc., the ore may be in the form of subdivided particles and/or particulates with 90% by weight being less than 2 inches in size or preferably 70-80% by weight being less than 0.5 inch in size. When the ore is processed under agitation, such as in a stirred reaction vessel or an agitated mill, the ore may be in the form of subdivided particles and/or particulates with 80% by weight passing through a 200 mesh and being retained on 300 mesh (80% −200 mesh, +300 mesh) and, preferably, 60% by weight passing through 200 mesh and being retained on 300 mesh (60% −200 mesh, +300 mesh). If desired, particulates can be formed or made in accordance with the teachings of U.S. patent application Ser. No. 07/894,059, filed Jun. 3, 1992, the disclosure of which is incorporated here by reference. The advantage of using such particulates is the improved surface area they present as a substrate on which a microbial agent can produce a biomass.

Since it has been found that consortium growth of biomass and precious metal recovery from ore particles and/or particulates at the top surface of columns is improved, it may be desirable to recirculate or "turn" the ore material in the bulk form. Further, bulk forms, such as heaps, that provide greater exposed surface area are therefore desired. The particles and/or particulate size of the ore material facilitates the growth and efficacy of the microbial consortium.

The microbial agent for use in the process of the present invention preferably comprises a microbial consortium comprising mixed cultures containing several genera, at least 2 or 3 to 5 distinct types. At least one of the microbes is capable of growth on hydrocarbons, such as kerosene and/or n-hexadecane. The consortium contains members of the genera Pseudomonas and Arthrobacter, among others.

The carbon deactivating bacterial consortium of the present invention preferably comprises at least two bacteria selected from the group consisting of

*Pseudomonas maltophilia,*
*Pseudomonas oryzihabitans,*
*Pseudomonas putida,*
*Pseudomonas fluorescens,*
*Pseudomonas stutzeri,*
Achromobacter species,
Arthrobacter species, and
Rhodococcus species.

One particular microbial consortium that is desirable is comprised of
*Pseudomonas maltophilia,*
*Pseudomonas oryzihabitous,*
*Pseudomonas putida,*
*Pseudomonas fluorescens,*
*Pseudomonas stutzeri,*
Achromobacter species,
Arthrobacter species and
Rhodococcus species and is referred to as the Carlin Black consortium (ATCC No. 55218) which originates from Newmont Gold Mining Company's Carlin Mine. On further analysis of this consortium, it has been found that the preliminary identification of certain microbial isolates as *Pseudomonas putida, Pseudomonas fluorescens, Pseudomonas stutzeri, Pseudomonas maltophilia,* Arthrobacter species and Rhodococcus species may be more appropriately assigned to the remaining microbial isolates identified, i.e., *Pseudomonas oryzihabitans,* Arthrobacter species and various strains of *Pseudomonas maltophilia.*

Another microbial consortium that is desirable is comprised of
*Pseudomonas putida,*
*Pseudomonas fluorescens,*
*Pseudomonas stutzeri,*
*Pseudomonas maltophilia* and
Arthobacter species and is referred to as Plant One consortium (ATCC No. 55219), that is, it originates from Newmont Gold Mining Company's Plant One. On further analysis of this consortium, it has been found that it may also include *Alcaligenes denitrificans.*

While the microbial agent has been described in terms of a consortium of microbes, it may be desirable to use an isolate from a microbial consortium or a single species of microbe. Further, in addition to the foregoing microbial consortia, carbon-solubilizing fungi, such as *Phanerochaete chrysosphorium,* may be desirable.

Prior to inoculation, the microbial consortium is grown in a suitable medium. Carlin Black microbial consortium (ATCC No. 55218) and Plant One microbial consortium (ATCC No. 55219) may be grown on a PUM culture medium or trypticase soy broth culture medium the composition of the PUM medium is:

22.2 g $K_2HPO_4 \cdot 3H_2O$
7.26 g $KH_2PO_4$
3.96 g $(NH_4)_2SO_4$
0.20 g $MgSO_4 \cdot 7H_2$)
1 liter distilled water The final pH is 7.1. The PUM medium is modified from the medium described in Rosenberg and Rosenberg, J. Bacteriol. 148: 51-57 (1981). Trypticase soy broth medium is available from BBL Microbiology Systems, Becton Dickinson and Co., Cockeysville, Ohio 21030 as BBL Trypticase Soy Broth and has the following general composition per liter of purified water:

| | |
|---|---|
| Pancreatic Digest of Casein | 17.0 g |

| -continued | |
|---|---|
| Papaic Digest of Soybean Mean | 3.0 g |
| Sodium Chloride | 5.0 g |
| Dipotassium Phosphate | 2.5 g |
| Dextrose | 2.5 g |

The final pH is 7.3±0.2.

While microbial consortium growth can be effected over a wide pH range (from about 5 to about 9), a pH of about 6 to about 7.5 is preferred (and a pH of 7.1 is even more desired) for growing the microbial consortia of the present invention. The incubation temperature is from about 20° C. to about 35° C.

Desirably, the microbial consortium is grown on culture medium from about 2 days to about 7 days. Although consortium grown for a longer or shorter period may be used, consortium grown for this length of time before inoculation is sufficiently effective.

The ore material is inoculated with microbial consortium at a concentration of from about $10^5$ to about $10^8$ colony-forming units per milliliter and preferably as a suspension in a nutrient solution, such as PUM medium. The desired pH of the inoculating solution should be from 5 to 9 and preferably from 5 to 7.

It is preferable to provide the microbial consortium, as inoculated, with a nutrient solution supplemented with a source of a microbe-metabolizable hydrocarbon. This hydrocarbon may be a $C_8$ to $C_{16}$ hydrocarbon, preferably, kerosene, diesel fuel or n-hexadecane.

It has been found that the use of a chelating agent prior to inoculation or during incubation facilitates deactivation of preg-robbing carbon. It is desirable to add the chelating agent either before inoculation or as a component of the inoculating solution. The preferred chelating agent is ethylene diamine tetraacetic acid (EDTA). The chelating agent should be added in an amount from about 0.5 to about 10 grams per 20 grams of ore and preferably from about 0.5 to about 5 grams per 20 grams of ore. However, addition of EDTA at levels below 0.05 grams per 20 grams of ore are not believed to be productive. Treatment with EDTA is capable of increasing gold extraction by cyanide/CIB leaching from about 45% to about 60% with microbial consortium treatment. (Results for carbon-in-leachant or carbon-in-pulp would be comparable.) (The term "CIB" refers to carbon-in-bag leaching, a leaching technique in which the activated carbon used to recover the precious metal-cyanide complex from the cyanide leaching solution is contained in porous bags. This technique is useful in laboratory studies since the activated carbon is kept discretely separate from the ore and is, therefore, readily recoverable.) While it is clearly possible to add more or less than these amounts of EDTA, it has been found that the greatest efficiency of use occurs with amounts in the foregoing ranges.

It has been found to be advantageous to include an additional source of microbe-metabolizable carbon, such as an organic carboxylic acid or carboxylate, such as, an acetate or citrate, or a carbohydrate, such molasses. Acetate or citrate may be supplied in the form of potassium or sodium citrate, or potassium or sodium acetate, sodium citrate being preferred. Desired concentrations are from about 0.1 to about 1.0 percent by weight of carboxylate salt to nutrient solution volume basis, and preferably, from about 0.1 to about 0.5 percent. Desired concentrations for molasses are from about 0.1 to about 10 grams per liter of nutrient solution.

Further, inorganic nutrients such as nitrogen, phosphorous and potassium sources, for example, ammonium sulfate, potassium phosphate and magnesium sulfate may be included. Inorganic nutrients may also be supplied in a slow release form, such as nutrient-absorbed prills. When using nutrient-absorbed prills, the incubation period may be from about 7 to about 30 days.

During incubation the microbial consortium, using the ore material as a substrate, metabolizes, multiplies and produces biomass. It is believed that during this growth process the microorganisms of the consortium deposit and attach themselves to the carbonaceous content of the ore material and that the biomass, including carboxylate, is produced by this deposit.

Incubation should extend for a sufficient length of time for the microbial consortium to grow and for microbes to at least partially coat the exposed carbonaceous content of the ore either with microbial colonies or with the biomass they produce. It has been found that incubation should extend for a period of from about 2 to about 10 days at ambient temperatures of from about 10 to about 35° degrees Celsius.

During incubation the ore can be provided with further inoculations of the consortium or further additions of various nutrients or both. If desired, consortium solution and/or nutrient solution can be recirculated through the ore during incubation. Preferably nutrient solution is recirculated. In a preferred embodiment, nutrients are maintained at the same levels as those that would be present in a medium used for growing the microbial agent before inoculation. Also, in a preferred embodiment the consortium solution and/or nutrient solution is continuously recirculated.

The desired effect of a properly incubated and grown microbial consortium is to produce biomass that, in turn, at least partially deactivates the carbon content by either blocking or "blinding" the carbon from later activity with dissolved or complexed precious metal in the leachant or lixiviant or directly metabolizing the carbon to a nonpreg-robbing form or both. One advantage in using a microbial consortium that metabolizes a hydrocarbon that blinds refractory carbon is that such hydrocarbon may also be used to provide additional "blinding" activity as well as being a nutrient for the microbial consortium.

Subsequent to the incubation, the precious metal values are recovered, such as by leaching or lixiviation. Suitable leaching techniques are cyanidation, carbon-in-leach cyanidation or carbon-in-pulp cyanidation. Such leaching techniques are known in the art and a general description appears in U.S. Pat. Nos. 4,902,345 and 4,923,510, the disclosure of each of which is incorporated here by reference. Further, it may be desirable to use thiosulfate, such as is disclosed in U.S. patent application Ser. No. 07/861,563, filed Apr. 1, 1992, the disclosure of which is incorporated here by reference. Thiourea leaching may also be used.

A preferred embodiment comprises inoculating the ore residue that follows completion of biooxidation.

Hence, the first step comprises biooxidation, such as by bioleaching of the mineral sulfide containing the occluded precious metal values, with an aqueous solution containing the iron- and sulfide-oxidizing bacteria capable of promoting the oxidation of the mineral sulfide, such as, at temperatures from about 15° C. to about 90° C., but not exceeding that temperature above which the particular group of biooxidative microorganisms is not viable. The biooxidation is carried out in the presence of nutrients required by the biooxidative microorganisms for growth for a time sufficient to oxidize the sulfide material and to substantially liberate the precious metal. The biooxidation solution, which may be a bioleach solution, is acidic with a pH ranging from about 0.5 to about 3.5, preferably about 0.5 to about 2. Following biooxidation the residue is neutralized, such as by washing with soda ash if necessary, to a pH ranging from about 5 to about 9, preferably about 6 to about 7.5.

The biooxidized residue is then inoculated with the microbial consortium capable of deactivating the precious-metal-adsorbing carbon. The carbon deactivation procedure is conducted in a solution containing nutrients for a period of time from at least about 24 hours to about 168 hours or longer. The biooxidized residue may also be treated using previously grown microbial consortium to provide a large quantity of the consortium and products of the growth of the microbial consortium. This procedure as above requires a period of time from at least 1 hour to 168 hours or longer for treatment of the ore. The precious-metal-containing residue is thereafter leached with an aqueous leach solution selective to the dissolution of the liberated precious metal.

The sulfide oxidation can be achieved using various types of chemolithotrophic autotrophic bacteria. *Thiobacillus ferrooxidans* bacteria are suitable for sulfide oxidation within the temperature range of about 15° C. to about 40° C. The facultative-thermophilic iron-oxidizing bacteria oxidize sulfides in a temperature range of about 35° C. to about 55° C. The Sulfolobus and Acidianus species are active from about 50° C. to about 90° C. Sulfide biooxidation may be carried out prior to or subsequent to the carbon deactivation by the consortia as disclosed herein.

In accordance with the above, the bacteria used for oxidative leaching comprise at least one bacteria selected from the group consisting of *Thiobacillus thiooxidans, Thiobacillus ferrooxidans*, Leptospirillum species, *Sulfobacillus thermosulfidooxidans* or similar species, *Sulfolobus brierleyi, Sulfolobus acidocaldarius*, Sulfolobus BC and *Sulfolobus solfataricus*.

Another embodiment of the invention is directed to a method of recovering precious metals from a refractory carbonaceous sulfide ore comprising, subjecting the ore to oxidative leaching in the presence of at least one bacterium selected from the group consisting of *Thiobacillus thiooxidans, Thiobacillus ferrooxidans*, Leptospirillum species, *Sulfobacillus thermosulfidooxidans* or similar species, *Sulfolobus brierleyi, Sulfolobus acidocaldarius*, Sulfolobus BC and *Sulfolobus solfataricus* at a temperature ranging from about 15° C. to about 90° C. and higher, but not exceeding that temperature at which said bacterium is degraded, and for a time at least sufficient to substantially oxidize the sulfide content of the ore and provide a residue containing sulfide-liberated precious metal values.

The above embodiment is coupled with subsequent treatment with microbial consortium and further comprises adjusting the pH of said residue, if necessary, to a pH ranging from about 5 to 9, and preferably from about 6 to about 7.5, followed by inoculating the residue with a carbon-deactivating microbial consortium comprising at least two bacteria selected from the group consisting of *Pseudomonas maltophilia, Pseudomonas oryzihabitans, Pseudomonas putida, Pseudomonas fluorescens, Pseudomonas stutzeri*, Achromobacter species, Arthrobacter species, and Rhodococcus species to liberate precious metal values adsorbed by said carbonaceous component of said ore residue, and then neutralizing and/or mixing the carbon-deactivated residue with an aqueous solution selective to the dissolution of the liberated precious metal values and thereby recover the precious metal values.

The precious metal values, e.g., gold or silver, are preferably recovered from the carbon-deactivated ore or the leached and carbon-deactivated residue by leaching or lixiviation, such as cyanidation which is a well-known process. Thiourea solutions can also be used to recover the precious metal values. The terms CIL, CIC or CIP used hereinabove mean carbon-in-leach, carbon-in-column and carbon-in-pulp cyanidation, respectively.

The carbon-in-leach technique involves contacting the ore pulp with either granular carbon and cyanide or ion exchange resins and thiourea solutions in a series of gently agitated tanks with sufficient retention time for recovery of the precious metal on the carbon. The carbon is passed countercurrent to the ore through the circuit to build up to precious metal loading. The loaded carbon is then separated from the pulp on a suitable screen coarse enough to retain the carbon but fine enough to allow the pulp to pass. The carbon is sent to a stripping column for desorption and recovery of the precious metal and regeneration of the carbon. The carbon-in-column technique involves extraction of the precious metal from the ore using a cyanide solution. The pregnant (gold loaded) solution is then passed through a series of carbon columns to recover the precious metal on the carbon. The loaded carbon is sent to a stripping process for desorption and recovery of the precious metal and regeneration of the carbon. In carbon-in-pulp cyanidation activated carbon is added to the cyanided ore pulp and then removed, with the precious metal values being recovered from the removed carbon.

Since the treatment of ore with microbial consortium lowers the pH of the ore, it may be desirable to use microbial consortium treatment as a pretreatment of carbonaceous-sulfidic ore before biooxidation of the sulfidic content of the ore. This is particularly true since microbial consortium treatment lowers the pH of carbonaceous-sulfidic ore to values that are favorable to *Thiobacillus ferrooxidans Leptospirillum ferrooxidans, Thiobacillus thiooxidans* and other sulfidic sulfur-oxidizing bacteria since microbial biooxidation takes place at a pH of less than 2.5 and the operable range appears to be from about 1.3 to about 2.0 for the foregoing sulfide oxidizing microorganisms and in fact acid treatment may be desirable in achieving an appropriate pH value. Alternatively, it may be desirable to biooxidize the ore material contemporaneously with incubation of the microbial consortium.

The present invention provides improved recovery of precious metal values, such as gold, from carbonaceous and carbonaceous-sulfidic ores, under a variety of recovery regimes as aforesaid.

In the examples that follow various aspects of the invention are further amplified. Such amplifications are intended to be illustrative and not limiting of the invention disclosed.

EXAMPLE 1

The microbial consortium is enriched from weathered or non-weathered ore by the ability of the microorganisms to utilize petroleum and other hydrocarbons, such as kerosene or hexadecane, to grow under aerobic conditions. This is accomplished by placing 20 g of ore in 100 ml of a nutrient salts solution containing 0.5% kerosene or hexadecane or other suitable hydrocarbon and 0.005% Difco yeast extract. The mixture is incubated at ambient temperature for one week with aeration. After one week, 5 ml of the solution is transferred to a new flask of nutrient salts medium and hydrocarbon and incubated as above. This is repeated 3 times. The microbial consortium is then maintained in the nutrient salts-hydrocarbon medium.

The nutrient medium for the growth of the microbial consortium may consist of the following:

7.26 g/l potassium phosphate monobasic [$KH_2PO_4$];
22.2 g/l potassium phosphate dibasic [$K_2HPO_4$];
3.96 g/l ammonium sulfate [$(NH_4)_2SO_4$];
0.2 g/l magnesium sulfate heptahydrate [$MgSO_4 \cdot 7H_2O$];
0.05 g/l yeast extract; and
0.25 to 1.0% kerosene or hexadecane.

The final pH of 7.1 is adjusted with either sulfuric acid [$H_2SO_4$] or caustic [NaOH] as needed. Growth is with aeration at temperatures ranging from 15° C. to 25° C. Significant growth generally occurs in 2 to 5 days. The consortium can be used to treat the ore after 2 days, or longer, of growth.

EXAMPLE 2

The microbial consortium is able to decrease the capacity of the organic component of refractory ore to bind gold in the form of gold cyanide. A sulfidic-carbonaceous ore, from Newmont Gold Company's Gold Quarry Deep West deposit, described below in Table 1, was treated with the microbial consortium to prevent adsorption of gold present as the gold cyanide complex.

TABLE 1

| Component | Weight Percent |
|---|---|
| Total sulfur | 2.95 |
| Sulfate sulfur | 0.45 |
| Sulfide sulfur | 2.50 |
| Total carbon | 0.77 |
| Acid insoluble (organic) carbon | 0.76 |

The ore was treated in one-liter stirred reactors. One treatment entailed treating 40 g of the ground ore in 500 ml of the consortium culture grown in the medium containing 0.5% kerosene described in EXAMPLE 1. Another treatment grew the consortium in the presence of 40 g of ground ore with 500 ml of the medium containing 0.5% kerosene described in EXAMPLE 1. The ore was treated for two weeks with stirring then separated from the solution, dried at ambient room temperature, 20° C. to 25° C., and tested for adsorption of gold cyanide. Five grams of treated, or untreated, ore was placed in a solution of potassium gold cyanide [$KAu(CN)_2$] containing either 2 or 5 mg Au/l at pH 10.5 to 11.5. The ore samples and gold cyanide solution were mixed for a period of 25 hours, 250 rpm, at ambient room temperature, 20° C. to 25° C. The ore was separated from the solution and the concentration of gold remaining in solution determined by atomic adsorption spectrophotometry. The results of the consortium treatment of the ore, Table 2, show the effect of the consortium to decrease the adsorption of the gold cyanide complex.

TABLE 2

| Treatment | Gold Concentration mg/l | | Gold Absorbed % |
| --- | --- | --- | --- |
| | Initial | Final | |
| untreated | 2 | 0.2 | 90 |
| | 5 | 1.6 | 68 |
| treated with pre-grown consortium | 2 | 1.5 | 25 |
| | 5 | 4.9 | 2 |
| treated by growing consortium with ore | 2 | 1.7 | 15 |
| | 5 | 4.1 | 18 |

The untreated ore effectively adsorbs gold from the gold cyanide solution, a phenomenon which prevents economic extraction of gold from the carbonaceous-sulfidic ore. Following treatment of the ore with the microbial consortium, the adsorption of the gold cyanide complex is significantly reduced. The apparent function of the consortium is to modify the properties of the carbon in the ore to prevent the removal of the solubilized gold. The consortium treatment facilitates gold recovery by either blocking or modifying the gold-adsorbing carbon of the refractory ore.

EXAMPLE 3

A sulfidic-carbonaceous gold ore, containing 0.09 ounce gold per ton, from the Newmont Gold Mining Company's Post ore deposit was treated in accordance with the invention. This ore contained the following as set forth in Table 3:

TABLE 3

| Component | Weight % |
| --- | --- |
| Total sulfur | 2.86 |
| Sulfate sulfur | 0.19 |
| Sulfide sulfur | 2.67 |
| Total carbon | .71 |
| Acid insoluble (organic) carbon | 0.67 |

A sample of the ore, ground to 80% minus 200 mesh, was first oxidized using a culture of *Thiobacillus ferrooxidans* with a nutrient acid solution as follows:
400 mg/l ammonium sulfate [$(NH_4)_2SO_4$];
40 mg/l potassium phosphate dibasic [$K_2HPO_4$];
400 mg/l magnesium sulfate heptahydrate [$MgSO_4 \cdot 7H_2O$];
and pH 1.6 to 2.0, adjusted with sulfuric acid ($H_2SO_4$). The biooxidation was accomplished in a stirred-tank-reactor, containing the ore at 40% pulp density, over a period of 14 days. This treatment of the ore resulted in the oxidation of 48.7% of the sulfide. The oxidized ore was separated from the suspending solution and resuspended in a pre-grown culture of the "Carlin Black" microbial consortium (ATCC NO. 55218), at pH 7 for a period of 7 days. The oxidized ore treated with the "microbial consortium" was separated from the suspending medium. The ore was then leached using cyanide and cyanide-CIL (carbon-in-leach) for extraction of gold. The results obtained for the untreated ore, and the samples treated with the above procedures are given in Table 4.

TABLE 4

| Treatment | Percent Gold Extraction | |
| --- | --- | --- |
| | Cyanide | Cyanide-CIL |
| Untreated | 0 | 4 |
| Biooxidized | 55.5 | 82.2 |
| Biooxidized and microbial consortium | 74.4 | 86.6 |

The biooxidation of the sample with *Thiobacillus ferrooxidans* increases gold extraction by cyanide from zero, for the untreated control, to 55.5%. Addition of carbon for the cyanide-CIL for gold leaching increases gold extraction to 4%, for the untreated control and to 82.2% for the biooxidized ore. The presence of the gold-recovery carbon in the cyanide leach process greatly enhances gold recovery from the biooxidized ore residue because the CIL-carbon more effectively adsorbs the gold-cyanide complex than the preg-robbing carbon present in the ore. Greater gold extraction occurs when the ore sample is treated by a combination of biooxidation and microbial consortium treatment, resulting in 74.4% extraction by a simple cyanide leach, and 86.6% by the cyanide-CIL leach procedure.

EXAMPLE 4

A sulfidic-carbonaceous ore from Newmont Gold Company's Gold Quarry Deep West deposit containing 0.156 ounce gold per ton, and described in EXAMPLE 2, can also be treated using a percolation-column procedure simulating a heap leach treatment process.

A sample of the ore, crushed and sized to a minus 6 mesh plus 10 mesh fraction (U.S.A. standard testing sieve), was first oxidized using a culture of *Thiobacillus ferrooxidans* for a period of 71 days. The nutrient solution and bacteria were recirculated through the column of ore during this period. This treatment of the ore resulted in the oxidation of 69.7% of the sulfide. One-half of the biooxidized ore residue was then treated using the Carlin Black microbial consortium (ATCC No. 55218) by recirculating a culture of the consortium through a column of ore for a period of 14 days. The biooxidized ore treated using the microbial consortium was then leached using cyanide-CIC (carbon-in-column) and thiourea-CIC for a period of 7 days. Without biooxidation pretreatment, gold extraction from this ore was nil. However, following biooxidation and biooxidation with consortium treatment, the gold extraction was increased (Table 5).

TABLE 5

| Treatment | Percent Gold Extraction | |
| --- | --- | --- |
| | Cyanide-CIC | Thiourea-CIC |
| Biooxidized | 13.5 | 57.1 |
| Biooxidized and microbial consortium | 41.4 | 63.5 |

Gold extraction from the biooxidized residue is low, 13.5%, using cyanide, but thiourea is more effective resulting in 57.1% extraction of the gold. Treatment of the biooxidized residue with the Carlin Black microbial consortium (ATCC No. 55218) further enhances the extraction of the gold using either cyanide or thiourea.

EXAMPLE 5

The refractory sulfidic-carbonaceous gold ore, described in EXAMPLE 4, can also be treated by the microbial process in a stirred-tank reactor. A sample of the ore, ground to 80% minus 200 mesh, at 40% pulp density, was oxidized using a culture of *Thiobacillus ferroxidans* for a period of 14 days. The residue had 66.4% oxidation of the sulfide component. The oxidized ore was separated from the suspending nutrient solution and resuspended in a pre-grown culture of the Carlin Black microbial consortium (ATCC No. 55218) at pH 6.9 to 7.2 for 7 days. Following the consortium treatment, 73.7% of the gold was extracted by cyanide-CIL.

Without consortium treatment, 46% to 54% of the gold can be extracted by cyanide-CIL from the biooxidized residue.

EXAMPLE 6

Grab samples of refractory carbonaceous ore (originating from Maggie Creek, Nev. from two stockpiles were tested. Relevant chemical analysis of these samples are shown in Table 6.

TABLE 6
REFRACTORY ORE STOCKPILE HEAD ANALYSIS

|  | MAGGIE CREEK - 1 | MAGGIE CREEK - 2 |
|---|---|---|
| Au (Fire) oz/ton | 0.150 | 01.69 |
| Au (CN-AA) oz/ton | 0.019 | 0.000 |
| C, % Total | 4.08 | 5.41 |
| C, % Org. | 0.07 | 0.29 |
| S, % Total | 0.90 | 1.24 |
| S, % Sulfate | 0.49 | 0.50 |
| S, % Sulfide | 0.41 | 0.74 |
| Fe, % | 2.30 | 2.18 |
| As, % | 0.16 | 0.10 |

Small scale cyanidation leach tests were conducted on each stockpile sample ground to about 60% minus 200 mesh. Results are shown in Table 7.

TABLE 7
CYANIDATION LEACH GOLD EXTRACTIONS

| Sample | Head Assay oz Au/ton | Gold Extraction* Percent |
|---|---|---|
| Maggie Creek - 1 | 0.150 | 5.3 |
| Maggie Creek - 2 | 0.169 | 26.6 |

*Based on the head and residue assay.

Biometallurgical test work involving treating the ore with Carlin Black microbial consortium (ATCC No. 55218) was conducted for various times followed by cyanidation using carbon-in-leachant. The results are shown in Table 8.

TABLE 8
RESULTS MICROBIAL CONSORTIUM TREATMENT/CYANIDATION

MAGGIE CREEK - 1 SAMPLE (0.150 OPT Au)

| Treatment | | |
|---|---|---|
| Consortium | Yes | Yes |
| Consortium, time, hours | 24 | 168 |
| Cyanidation | | |
| Residue, OPT Au | 0.063 | 0.099 |
| Au Extraction, %* | 58.0 | 34.0 |

MAGGIE CREEK - 2 SAMPLE (0.169 OPT Au)

| Treatment | | |
|---|---|---|
| Consortium | Yes | Yes |
| Consortium, time, hours | 24 | 168 |
| Cyanidation | | |
| Residue, OPT Au | 0.089 | 0.072 |
| Au Extraction, %* | 47.3 | 57.4 |

*Cyanidation gold extractions based on the head and residue assays

Air oxidation tests were conducted using ore ground to about 60% minus 200 mesh and adjusted to about 40% solids in a flotation cell. Air was injected into the pulp at a rate of 1000 mls/minute at room temperature. After 24 hours of air oxidation, the samples were either:
1) treated using consortium for 168 hours followed by cyanidation, or
2) cyanided directly as a control.

The stockpile samples investigated were Maggie Creek-2 due mainly to its high sulfide sulfur contents (0.74%). (However, this ore is classified as carbonaceous since the gold values are not associated with the sulfidic component of the ore.) The test results, shown in Table 9, indicate that the organic carbon and sulfide sulfur contents decreased slightly with increasing time. Cyanidation gold extractions on 24 hour materials with and without consortium treatment indicate an increase in extraction with consortium treatment of the Maggie Creek-2 sample.

TABLE 9
AIR OXIDATION TEST RESULTS - Maggie Creek - 2

| Head Analysis | |
|---|---|
| S, % total | 1.24 |
| S, % sulfide | 0.74 |
| C, % total | 5.41 |
| C, % organic | 0.29 |
| 2 hours | |
| Pulp pH | 8.1 |
| Temp. °C. | 55 |
| Solids Analysis | |
| S, % total | 1.20 |
| S, % sulfide | 0.66 |
| C, % total | 5.80 |
| C, % organic | 0.29 |
| 4 hours | |
| Pulp pH | 8.0 |
| Temp. °C. | 60 |
| Solids Analysis | |
| S, % total | 2.22 |
| S, % sulfide | 0.69 |
| C, % total | 5.77 |
| C, % organic | 0.25 |
| 6 hours | |
| Pulp pH | 8.1 |
| Temp. °C. | 59 |
| Solids Analysis | |
| S, % total | 1.21 |
| S, % sulfide | 0.68 |
| C, % total | 5.78 |
| C, % organic | 0.22 |
| 24 hours | |
| Pulp pH | 8.1 |
| Temp. °C. | 42 |
| Solids Analysis | |
| S, % total | 1.20 |
| S, % sulfide | 0.75 |
| C, % total | 5.73 |
| C, % organic | 0.19 |
| Cyanidation Au Extraction (%) of the 24 hour solids | |
| Control | 25 |
| Consortium* | 53 |

*168 hour treatment prior to cyanidation

As shown in Table 10 consortium treatment increased gold extraction both from non-air-oxidized material and air oxidized material.

TABLE 10
COMPARISON OF GOLD EXTRACTION

|  | NaCN | Cons/NaCN | NaCN | Cons/NaCN |
|---|---|---|---|---|
| Maggie Creek - 2 | 27 | 57 | 25 | 53 |

EXAMPLE 7

A sample of minus 10 mesh ore from biooxidized (40% sulfide oxidation) Gold Quarry refractory carbonaceous-sulfidic gold ore described below in Table 10A was treated with Carlin Black consortium (ATCC No. 55218) and citrate using the procedure set forth in Example 10.

TABLE 10A

| Component | Weight Percent |
| --- | --- |
| Total Sulfur | 1.80 |
| Sulfate Sulfur | 0.95 |
| Sulfide Sulfur | 0.85 |
| Total Carbon | 1.23 |
| Acid insoluble (organic) carbon | 1.19 |

The results in Table 11 show the positive effect of increased biopolymer/consortium growth on the reduction of preg-robbing and increased gold extraction (head, 0.078 oz Au/ton).

TABLE 11

Consortium treatment of biooxidized ore

| Treatment | % Au Adsorbed (2.25 ppm Au spike) | Au Extraction by CN/CIB residue, ounces per ton | % |
| --- | --- | --- | --- |
| Control | 79 | 0.054 | 31 |
| Consortium, added once/week, 4 weeks | 55 | 0.046 | 41 |
| Consoritum added with citrate, twice over 4 weeks | 49 | 0.044 | 44 |
| Consortium added with citrate, four times over 4 weeks | 35 | 0.041 | 47 |

These results show a correlation with stimulation of consortium growth, resulting in a decrease of carbon activity for preg-robbing and in an increase in gold extraction.

EXAMPLE 8

Two hundred grams of a refractory carbonaceous-sulfidic gold ore having the same composition as Example 7 whose sulfidic sulfur content had been biooxidized to a level of 0.35 weight percent sulfidic sulfur was suspended in one liter of PUM medium which also included 5 ml. of 10% aqueous sodium citrate (or 0.5% weight to volume) and 100 ml. of 4×concentrated Carlin Black consortium (ATCC #55218) (or 10¹⁰ colony-forming units per liter) in a one liter kettle equipped with motorized turning blades to suspended the ore. The ore was kept in suspension for seven days and then allowed to settle on the seventh day. The aqueous phase was removed and replaced with one liter of PUM medium to which 5 ml. of 10% sodium citrate (or 0.5% weight to volume) had been added. The ore was kept in suspension for an additional two weeks and then allowed to settle and the aqueous phase removed. A sample of the ore was tested for gold extraction with the results shown in Table 12, as follows:

TABLE 12

| Extraction Method | CN | CN/CIL |
| --- | --- | --- |
| Residue, Au opt | 0.053 | 0.017 |
| Carbon, Au opt | — | 1.188 |
| Aqueous, Au opt | 0.0026 | 0.0000 |
| Calculated Head Au opt | 0.057 | 0.059 |
| % Au Recovery | 32.1 | 78.2 |

TABLE 12-continued

| Extraction Method | CN | CN/CIL |
| --- | --- | --- |
| (assay) | | |
| % Au Recovery (calculated) | 7.0 | 71.2 |
| % Au Recovery (solution) | 4.85 | — |
| % Au Recovery (carbon) | — | 53.9 |

Gold extraction results yielded 78% based on the head value and 71% based on the calculated head for cyanide leaching using carbon in leachant (CN/CIL.)

EXAMPLE 9

Twelve one hundred gram samples of a refractory carbonaceous sulfidic gold ore from Newmont Gold Company's Gold Quarry deposit and described in Table 10A, six of which had been biooxidized to a sulfidic sulfur content of 0.6% and six of which had not been biooxidized, were pretreated and then treated as indicated in Table 13.

TABLE 13

| SAMPLE | BIO-OXIDIZED | PRE-TREATMENT | TREATMENT |
| --- | --- | --- | --- |
| 1 | Yes | Yes | Control |
| 2 | Yes | Yes | Control & Acetate |
| 3 | Yes | Yes | Consortium |
| 4 | Yes | Yes | Consortium & Acetate |
| 5 | Yes | No | Control |
| 6 | Yes | No | Control & Acetate |
| 7 | No | Yes | Control |
| 8 | No | Yes | Control & Acetate |
| 9 | No | Yes | Consortium |
| 10 | No | Yes | Consortium & Acetate |
| 11 | No | No | Control |
| 12 | No | No | Control & Acetate |

Samples 1–4 and 7–10 were pretreated by suspending the sample in a 0.10M aqueous solution of sodium EDTA for two hours at ambient temperature, after which the aqueous phase was drained and the pretreated ore then treated as indicated. The treatment with "Control" simply means that there was no treatment with a microbial consortium; treatment with "Control & Acetate" meaning that there was no treatment with a microbial consortium but the sample was treated with a 0.65% (weight to volume) aqueous solution of sodium acetate. The treatment with "Consortium" comprised suspending the ore sample in 100 ml. of PUM medium in a 0.25 liter vessel containing concentrated Carlin Black consortium (ATCC #55218) at 10¹⁰ colony-forming units per liter and the ore sample agitated for 7 days, after which the aqueous phase was drained and the ore sample recovered. Treatment with "Consortium & Acetate" comprises the same treatment as that for "Consortium" except that 6.5 ml. of 10% (wt. to vol) aqueous sodium acetate was also added to the initial 100 ml. of PUM medium.

The drained ore samples were then subjected to gold extraction by cyanide leaching with carbon in bag (CN/CIB). The results are tabulated in Table 14.

TABLE 14

| SAMPLE | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Residue, Au opt | 0.0405 | 0.0383 | 0.0287 | 0.0294 | 0.0508 | 0.0525 | N/A | 0.056 | 0.0345 | 0.0433 | 0.0525 | 0.0509 |
| Carbon, Au opt | 0.6439 | 0.595 | 0.7763 | 1.0556 | — | — | — | — | — | — | — | — |
| Calculated | 0.077 | 0.071 | 0.076 | 0.089 | — | — | — | — | — | — | — | — |

TABLE 14-continued

| SAMPLE | 1 | 2 | 3 | 4 | 5 | 6 | 7 | 8 | 9 | 10 | 11 | 12 |
|---|---|---|---|---|---|---|---|---|---|---|---|---|
| Head, Au opt | | | | | | | | | | | | |
| % Au Recovery | 48.1 | 50.9 | 63.2 | 62.3 | 34.9 | 32.7 | N/A | 28.2 | 55.8 | 44.5 | 32.7 | 34.7 |

As can be seen from Table 14, treatment by a microbial consortium improved gold recovery, particularly with ore that had been biooxidized before treatment with microbial consortium (as opposed to no biooxidation). Treatment with microbial consortium and acetate improved gold recovery further.

EXAMPLE 10

Six one kilogram samples of a refractory carbonaceous-sulfidic gold ore from Newmont Gold Company's Gold Quarry deposit as described in Table 10A whose sulfidic sulfur content had been biooxidized to a sulfidic sulfur content of 0.35% (wt.) were loaded into six 41 cm long by 6 cm diameter columns.

The samples were treated as indicated in Table 15.

TABLE 15

| SAMPLE | TREATMENT |
|---|---|
| 1 | PUM |
| 2 | CB1 + PUM |
| 3 | CB1 + 1X CITRATE |
| 4 | CB1 + 2X CITRATE |
| 5 | CB1 + 4X CITRATE |
| 6 | CB1 + 4X PUM |

The ore in the columns was aerated and PUM medium was recirculated through them for four weeks. Sample 1 was inoculated once at the beginning of the four week period with 82.6 ml. of PUM medium and no microbial consortium. Sample 2 was inoculated once at the beginning of the period with 82.6 ml. of 1×concentrated Carlin Black consortium (ATCC #55218) ($1 \times 10^{11}$ colony-forming units per liter) in PUM medium. Sample 3 was inoculated once at the beginning of the period with 82.6 ml. of 1×concentrated Carlin Black consortium (ATCC #55218) ($1 \times 10^{11}$ colony-forming units per liter) and 150 ml. of a 0.65% (wt. to vol) aqueous solution of sodium citrate. Sample 4 was inoculated both initially and a second time with 82.6 ml. of 1×concentrated Carlin Black consortium (ATCC #55218) ($1 \times 10^{11}$ colony-forming units per liter) and 150 ml. of 0.65% (wt. to vol.) aqueous solution of sodium citrate. Sample 5 was inoculated initially and at three evenly spaced intervals during the period with 82.6 ml. of 1×concentrated Carlin Black consortium (ATCC #55218) ($1 \times 10^{11}$ colony-forming units per liter) and 150 ml. of 0.65% (wt. to vol.) aqueous solution of sodium citrate. Sample 6 was inoculated initially and at three evenly spaced intervals with 82.6 ml. of 1×concentrated Carlin Black consortium (ATCC #55218) ($1 \times 10^{11}$ colony-forming units per liter) in PUM medium.

At the end of the four week period, the aqueous phase was drained, and the ore washed with deionized water. Three ten gram specimens were taken from each column—one each from the top, middle and bottom of the column. Each specimen was tested with respect to its ability to adsorb gold from solution (or "preg-rob") by placing each specimen in a flask containing 100 ml. of an aqueous solution of potassium gold cyanide [KAu(CN)$_2$] containing 2.25 parts per million of gold. Each flask was shaken for 24 hours and the aqueous phase recovered. The amount of gold that each specimen had adsorbed or "loaded" from solution was determined by atomic absorption spectroscopy. The results are reflected in Table 16.

TABLE 16

| AU, % (Wt.) loaded on sample | | |
|---|---|---|
| TOP | MIDDLE | BOTTOM |
| 82 | 82 | 74 |
| 70 | 65 | 70 |
| 42 | 45 | 50 |
| 46 | 47 | 54 |
| 37 | 30 | 38 |
| 55 | 50 | 60 |

It is apparent that treatment with microbial consortium decreased preg-robbing and that this deactivation was more apparent in the top of the column. Further, multiple additions of sodium citrate during the course of incubation of the microbial consortium improved results, i.e., decreased the amount of gold loaded and, therefore, the preg-robbing activity of the ore.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

We claim:

1. A method for recovering precious metal values from a refractory carbonaceous ore material including a carbonaceous component that has the propensity of retaining the precious metal values in the ore upon treatment of the ore material with a leachant or lixiviant for the precious metal values comprising
   a. inoculating the carbonaceous ore material with a carbon-deactivating microbial consortium
   b. incubating the inoculated material under conditions sufficient to reduce the propensity of the carbonaceous component to retain precious metal values,
   c. treating the incubated material with a leachant or lixiviant for the recovery of precious metal values and
   d. recovering the precious metal values 2. A method as defined in claim 1 wherein said ore material is in a heap formation.

3. A method as defined in claim 1 wherein said microbial consortium is grown in a nutrient medium, prior to inoculation for a period of about 7 to about 10 days.

4. A method as defined in claim 1 wherein said microbial consortium is provided with a consortium-metabolizable source of carbon.

5. A method as defined in claim 4 wherein said source of carbon comprises n-hexadecane kerosene or diesel fuel.

6. A method as defined in claim 1 wherein said microbial consortium is provided with an organic carboxylic acid source.

7. A method as defined by claim 6 wherein said carboxylic acid source comprises a citrate.

8. A method as defined in claim 1 wherein said microbial consortium is provided with a chelating agent.

9. A method as defined by claims 8 wherein said chelating agent comprises ethylene diamine tetracetic acid.

10. A method as defined by claim 1 wherein said microbial consortium is provided with a nutrient solution during incubation.

11. A method as defined by claim 10 wherein said nutrient solution is recirculated during incubation.

12. A method according to claim 1 wherein said ore comprises a particulate formed of biooxidized carbonaceous-sulfidic ore.

13. A method according to claim 1 wherein said incubation is conducted for a period of about 2 days to about 10 days at a temperature from about 15° to about 35° Celsius.

14. A method according to claim 1 wherein the method includes biooxidizing ore material after incubation and prior to treatment with a leachant or lixiviant.

15. A method according to claim 1 wherein the method includes biooxidizing ore material before inoculation.

16. A carbonaceous ore particulate having recoverable precious metal values and a precious metal value-absorbing carbon content including a carbon-deactivating microbial consortium 17. A carbonaceous-sulfidic ore particulate having recoverable precious metal values and a precious metal value-absorbing carbon content including a carbon-deactivating microbial consortium.

* * * * *